(12) United States Patent
Nelamangala et al.

(10) Patent No.: US 10,628,462 B2
(45) Date of Patent: Apr. 21, 2020

(54) PROPAGATING A STATUS AMONG RELATED EVENTS

(71) Applicant: LinkedIn Corporation, Mountain View, CA (US)

(72) Inventors: Vivek Nelamangala, Mountain View, CA (US); Strahinja Markovic, Mountain View, CA (US); Sara F. Todd, San Jose, CA (US); Parinkumar D. Shah, Milpitas, CA (US); Erran Berger, San Francisco, CA (US); Rushi P. Bhatt, Bangalore (IN); Tomer Cohen, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 15/194,162

(22) Filed: Jun. 27, 2016

(65) Prior Publication Data

US 2017/0371952 A1    Dec. 28, 2017

(51) Int. Cl.

| G06F 17/00 | (2019.01) |
|---|---|
| G06F 16/28 | (2019.01) |
| H04L 29/08 | (2006.01) |
| G06F 16/901 | (2019.01) |
| G06Q 10/02 | (2012.01) |
| G06Q 50/00 | (2012.01) |
| G06Q 10/10 | (2012.01) |
| G06F 16/9535 | (2019.01) |

(52) U.S. Cl.
CPC ........ *G06F 16/288* (2019.01); *G06F 16/9024* (2019.01); *G06F 16/9535* (2019.01); *G06Q 10/02* (2013.01); *G06Q 10/109* (2013.01); *G06Q 50/01* (2013.01); *H04L 67/306* (2013.01)

(58) Field of Classification Search
CPC ......... G06F 17/30604; G06F 17/30958; G06F 16/288; G06F 1/9024; G06F 16/9024; G06F 16/9535
USPC ........................................................ 707/737
See application file for complete search history.

(56) References Cited

U.S. PATENT DOCUMENTS

| 9,251,113 | B1 * | 2/2016 | McIlroy | G06Q 50/01 |
|---|---|---|---|---|
| 9,411,862 | B1 * | 8/2016 | Wang | G06F 16/2471 |
| 9,875,272 | B1 * | 1/2018 | Jhingran | G06F 16/2365 |
| 2011/0029376 | A1 * | 2/2011 | Mills | G06Q 30/02 705/14.43 |

(Continued)

*Primary Examiner* — Mark E Hershley
(74) *Attorney, Agent, or Firm* — Park, Vaughan, Fleming & Dowler LLP

(57) ABSTRACT

A system, method, and apparatus are provided for propagating a status among related events. A relationship component of the system maintains a graph of the related events and, upon assignment of a status to an event identifies one or more related events (e.g., the root event, other ancestor events, descendant events). A retention component of the system includes multiple nodes that maintain user records (e.g., sharded by user identifier) storing events associated with the members and that also maintain separate event status tables to identify statuses of selected events. For example, an event status table may store statuses of root events and/or other ancestor events from which a given subsequent event may inherit or derive a status. An event status may reflect a quality or characteristic of the event (e.g., spam, low quality, language of the event), a status of the associated user (e.g., fame, level of influence), etc.

19 Claims, 5 Drawing Sheets

(56) References Cited

U.S. PATENT DOCUMENTS

| | | | |
|---|---|---|---|
| 2011/0196855 A1* | 8/2011 | Wable | G06O 30/02 707/711 |
| 2012/0005224 A1* | 1/2012 | Ahrens | H04W 4/21 707/769 |
| 2012/0137367 A1* | 5/2012 | Dupont | G06F 21/00 726/25 |
| 2012/0200567 A1* | 8/2012 | Mandel | G06T 11/206 345/420 |
| 2012/0290950 A1* | 11/2012 | Rapaport | H04L 51/32 715/753 |
| 2013/0073389 A1* | 3/2013 | Heath | G06Q 50/01 705/14.54 |
| 2014/0019626 A1* | 1/2014 | Hubler | H04L 65/1006 709/227 |
| 2014/0122510 A1* | 5/2014 | Namkoong | G06F 16/278 707/755 |
| 2014/0149794 A1* | 5/2014 | Shetty | H04L 67/1095 714/20 |
| 2015/0120555 A1* | 4/2015 | Jung | G06Q 20/40 705/44 |
| 2015/0120771 A1* | 4/2015 | Lee | H04W 4/21 707/758 |
| 2015/0142888 A1* | 5/2015 | Browning | G06F 16/285 709/204 |
| 2015/0180746 A1* | 6/2015 | Day, II | H04L 51/16 455/405 |
| 2015/0296033 A1* | 10/2015 | Jung | G06Q 50/01 709/217 |
| 2016/0063594 A1* | 3/2016 | Kalikivayi | G06Q 30/0629 705/26.63 |
| 2016/0085839 A1* | 3/2016 | D'Halluin | G06F 16/278 707/747 |
| 2016/0255139 A1* | 9/2016 | Rathod | G06F 16/9535 709/203 |
| 2016/0292881 A1* | 10/2016 | Bose | G06K 9/00342 |
| 2016/0350696 A1* | 12/2016 | Delaney | G06F 16/26 |
| 2017/0091334 A1* | 3/2017 | Kabiljo | G06F 16/9535 |
| 2017/0123931 A1* | 5/2017 | Aizman | G06F 11/1448 |
| 2017/0161619 A1* | 6/2017 | Franceschini | G06N 5/022 |
| 2017/0161651 A1* | 6/2017 | Demarchi | G06F 16/29 |
| 2017/0199920 A1* | 7/2017 | Pearson | H04L 67/306 |
| 2018/0276269 A1* | 9/2018 | Rasscevskis | G06F 16/275 |

\* cited by examiner

PROPAGATING A STATUS AMONG RELATED EVENTS

BACKGROUND

This disclosure relates to the fields of computer systems and data processing. More particularly, a system, method, and apparatus are provided for efficiently propagating a status or feature among related events in an online application or service.

Professional and social networks, as well as other online applications and services, encompass many users or members and host myriad events every day. Typically, each event is stored as a discrete record, entry or other data construct. However, in reality, many events may be related. For example, an initial event such as a user post, the sharing of an article, a job posting, or some other action will be followed by activity such as likes, shares/re-shares, comments, and so on.

A problem arises if one event within a group of related events is assigned a particular status or feature and there is a need or desire to propagate that status or feature to some or all related events. For example, if a shared article or a post is deemed to be spam, the application or service may understandably wish to prevent that content item from being displayed to (and thereby annoying) its users. By the same token, it may also be desirable to prevent related comments, shares, and/or other events from being displayed.

In a traditional environment, finding events related to a given event may require extensive searching through many, many records, and may significantly affect other processing and data operations. In a distributed data storage environment, for example, each separate storage node, system, cluster or other entity may undergo extensive processing to identify all related events.

In addition, some online applications and services treat spam and low-quality content (such as memes, math or word puzzles, etc.) in the same manner, by completely suppressing them to prevent their distribution. However, some content that may be considered low-quality may be of interest to some users of the site, and preventing its distribution may deprive those users of some enjoyment.

DETAILED DESCRIPTION

Figure 1:
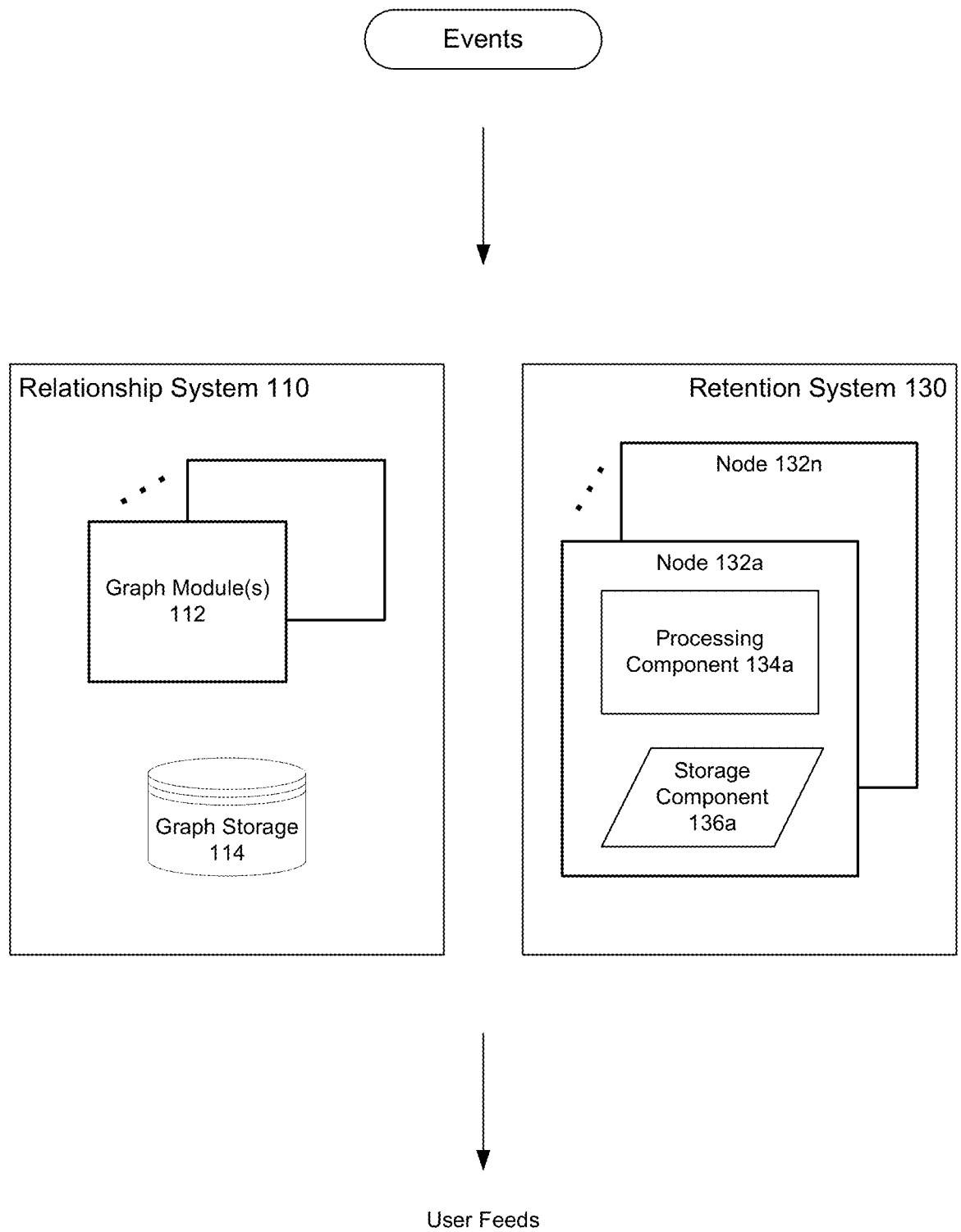
FIG. 1 is a block diagram illustrating an environment for facilitating the propagation of a status among related events, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for facilitating the propagation of a status or feature assigned to a specific event within an online application or service, to one or more related events.

In these embodiments, graph-based representations are maintained of separate collections of related events. Each representation may have a root event, or content item, and any number of descendant events. When one event in a collection of events is subsequently assigned a particular status, the representation allows its related events to be identified quickly, so that the status can be imputed to any or all of them, as warranted.

Illustrative statuses (or features) that may be assigned or imputed to an event reflect a condition or quality of the event or of a content item associated with the event (e.g., spam, low quality); a category into which the event or content item can be placed (e.g., puzzle, photo, meme); a characteristic of the event (e.g., language, region, category or nature); a status or role of a user that initiated, conducted, or is otherwise associated with the event (e.g., influential person, subject matter expert, celebrity); and so on. Although often used in the singular form below (i.e., 'status'), a given event's status may comprise multiple distinct statuses (e.g., spam, English language, and low quality).

When a new event is stored, metadata identifying one or more events to which the new event is related (if any) may also be stored. In some embodiments, metadata stored for an event includes links to or identifiers of one or more ancestor events (e.g., a root event, a parent event that is the subject of the new event) and/or descendant events (e.g., a later event that is based on the new event). For example, after an article is shared by a first user, a second user comments on the article or the share event, and a third user "likes" the comment, the share event (or article) is the root event of this set of events, the share (or article) and comment events are ancestors to the like event, and the comment and like events are descendants of the share event (or content item). When events related to a given event need to be located, the graph and/or event metadata allow the related events to be rapidly identified without having to review every stored event (e.g., to determine whether or not it is related).

Thus, by storing statuses of certain events (e.g., root events, selected ancestor events) separate from the events themselves, and because the graph-based representation identifies related events, when a new event is ingested statuses of one or more ancestors can be imputed to it without having to first search among stored events to find them. The new event may be tagged (e.g., in metadata) with the same status (e.g., spam) or a transitive status that indicates the status was inherited or assigned by association (e.g., spam transitive, derived spam).

FIG. 1 is a block diagram illustrating an environment for facilitating the propagation of a status among related events, according to some embodiments.

The environment of FIG. 1 includes relationship system 110 and retention system 130. Illustratively, the environment of FIG. 1 may be part of or may encompass a data center (or a portion of a data center) dedicated to operation of a professional network, a social network, or some other online application or service characterized by a high volume of related events. Although depicted as separate systems in FIG. 1 having distinct components, the relationship system and retention system may alternatively be implemented as separate components of one system (e.g., one computing apparatus, a cluster of computer systems). For example, each component may operate according to a separate module or collection of computer-readable instructions executed by the same or different computer processors.

Events handled within the environment may depend upon the application or service. Thus, for a professional network or a social network, the events may include actions concerning a content item or another event, such as sharing it, posting it, liking it, commenting on it, tagging it, mentioning a member or user, etc. Content items may include articles, video clips, photographs, posts, comments, job postings, etc. In the environment of FIG. 1, the events are initiated by members (or users) of the professional network or social network and/or by components of the network, possibly including components not shown in the figure. Some events are served to users within custom user feeds, based on their interests, their connections within the network, and/or other factors. User feeds and/or individual events may be served by retention system 130 or some other component not illustrated in FIG. 1 (e.g., a content server, a serving system).

Relationship system 110 includes one or more graph modules (e.g., processes, servers, other computing machines) for generating and maintaining graphs of related events, and storage 114 for storing some or all graphs. Storage 114 may be shared among multiple graph modules and/or each graph module may have access to its own storage. Although depicted as secondary storage (e.g., disk, solid-state device), graph storage 114 may also (or instead) include primary storage (e.g., random-access memory).

Retention system 130 includes multiple nodes 132 (or clusters of nodes), such as nodes 132a-132n, wherein each node comprises a processing component 134 (e.g., a processor, a server, some other computing component), such as processing component 134a of node 132a, and one or more storage components 136 (e.g., random-access memory, solid-state device), such as storage component(s) 136a of node 132a.

In some embodiments, events within the professional network, social network, or other application/service supported by the environment of FIG. 1 are sharded or segregated by identifiers of users associated with the events, wherein each event initiated or performed by a user is associated with that user. In these embodiments, each retention system node 132 maintains event data (and metadata) for events associated with a different subset of the users. Therefore, a related group of events may be stored across multiple different nodes. Backup nodes may mirror or replicate primary nodes to provide fault tolerance.

When a user initiates a new event within the environment of FIG. 1, relationship system 110 adds the event to an existing graph of related events if it is related to an event that is already part of a graph. Otherwise, the relationship system may create a new graph when a new event is received that is related to a previously isolated event. An illustrative graph of related events is discussed below in conjunction with FIG. 2.

In parallel with updating or creating a relationship graph, retention system 130 stores the event (and associated metadata) on a node corresponding to the associated user. In some embodiments, storage component 136 of a given node 132 includes a user data record (or other logical structure) for each user in the subset of users whose events are stored on the node. When a new event is received, the corresponding user is identified, the event is reported or forwarded to the associated node 132, and the event is stored in the user's user data record, along with any applicable metadata. Data/metadata for a given event stored in a user data record may include some or all of (but are not limited to): user identifier, event identifier, an identifier of the type of the given event, timestamp, an identifier of the parent content item or previous event that the given event is based on or concerns, an identifier of the root event (e.g., the earliest event among the new event's related events), etc.

In addition, however, and as discussed below in conjunction with FIG. 2, storage component 136 of each node 132 also stores an event status table (or other data structure) that identifies statuses of any number of events. The events for which statuses are stored in the event status table of a given node may include events stored in the user data records of the node and/or events stored on other nodes.

For example, an event status table may store statuses of root events of some or all collections of related events that have been graphed by the relationship system, events that are ancestors of events stored in the node's user data records, and/or events that are descendants of events stored in the user data records.

Figure 2A:
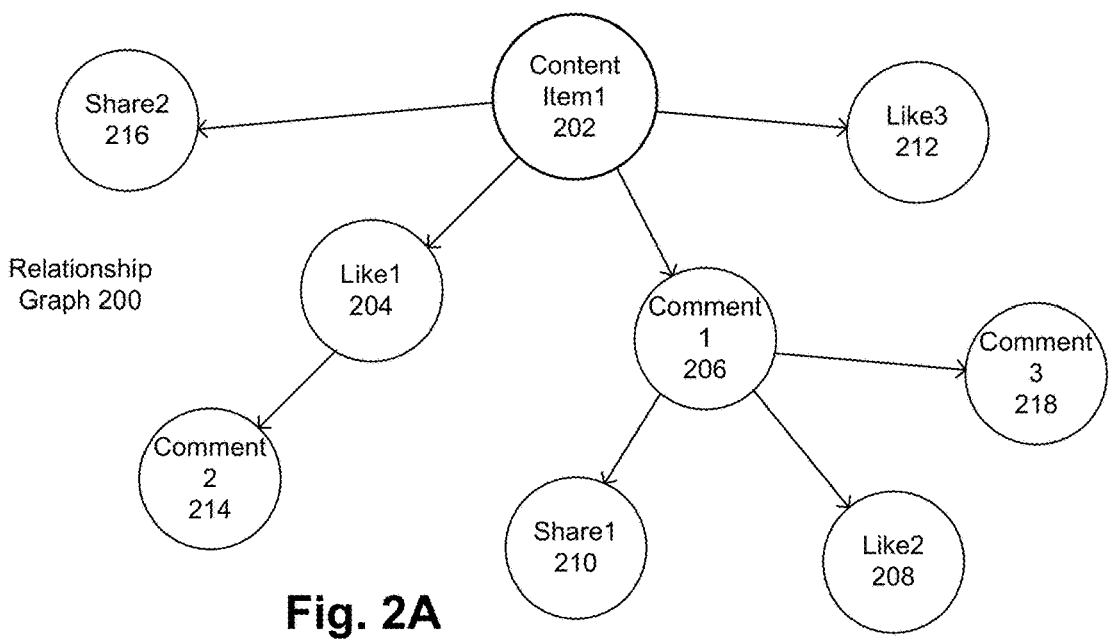
FIG. 2A is an illustrative graph of a collection of events, in accordance with some embodiments.

FIG. 2A is an illustrative graph of a collection of events, in accordance with some embodiments. Although relatively few in number in this example, a graph of related events may include hundreds or thousands of events in other examples, or more. The events of FIG. 2A may be events generated within a network of users, such as a social network or a professional network, in which case the users may alternatively be termed members.

The related events of FIG. 2A began with the sharing or posting of content item 1. This initial (root) event 202 may be unique among the set of related events in that it corresponds to or regards a "thing"—a content item. Other events, as will be seen, may correspond to "actions"—liking, commenting, etc. on a previous event. Alternatively, of course, event 202 may be characterized as a share, a post, or whatever action made content item 1 available to members of the network.

After content item 1 was made available via event 202, events 204-218 occurred. In FIG. 2A these events are numbered based on the order in which they occurred. Thus, the first related event is a first like (event 204), followed by a first comment (event 206), both of which regard (i.e., are based on or concern) event 202. Thus, event 202 is both the parent and root for events 204, 206. Then, in events 208-210, a second like (event 208) and a first share (event 210) are based on the first comment.

Subsequently, event 212 is a third like (of content item 1 or event 202), event 214 is a second comment (on the first like or event 204), event 216 is a second share (of content item 1 or event 202 (assuming that the first share was event 202)), and event 218 is a third comment (on the first comment or event 206). As seen in the figure, the various actions have been assigned ordinal identifiers (i.e., Like1, Comment2) that are global in nature. In some other implementations the identifiers may pertain to the actions' immediate parents. Thus, event 212 could instead be characterized as the second like of event (or content item) 202, event 218 could be considered the first comment of event 206, and so on.

In some embodiments, as or after each event 202-218 is received and added to relationship graph 200 (e.g., at a relationship system), the event is forwarded for retention (e.g., at a retention system). More particularly, in an embodiment in which member events are sharded by member identifier (e.g., across multiple nodes in a retention system), the identifier of a member associated with a new event (e.g., the member that performed or initiated the event) is used to determine which shard to send the event to, so as to avoiding having to send every event to every node.

Along with the transmission of a new event for storage or retention at a given retention/storage node, information such as the member identifier, event identifier, type of event, time, status of the event, and identifiers of one or more related events (e.g., ancestor events) is also sent. Some or all of this information is stored in the associated member's data record on the corresponding retention node. In particular, the status (and identifier) of the root event of the new event may be sent to the node, especially if the new event if the first event in the current set of related events to be stored on the node. It may be noted that whenever the status of that root event changes, its new status may be sent to all nodes (or at least all nodes that store the root event or at least one related event). Statuses of some or all of the new events' ancestors other than the root node may also be sent to the node.

In some implementations, little or no status information regarding events is stored with or within a relationship graph or the relationship system/component that maintains the graph. In these implementations, the graph allows rapid identification of some or all events related to a given event (e.g., such as a new event added to the relationship graph), but maintaining and identifying event statuses may be responsibilities of some other system component(s), such as a retention system/component.

Figure 2B:
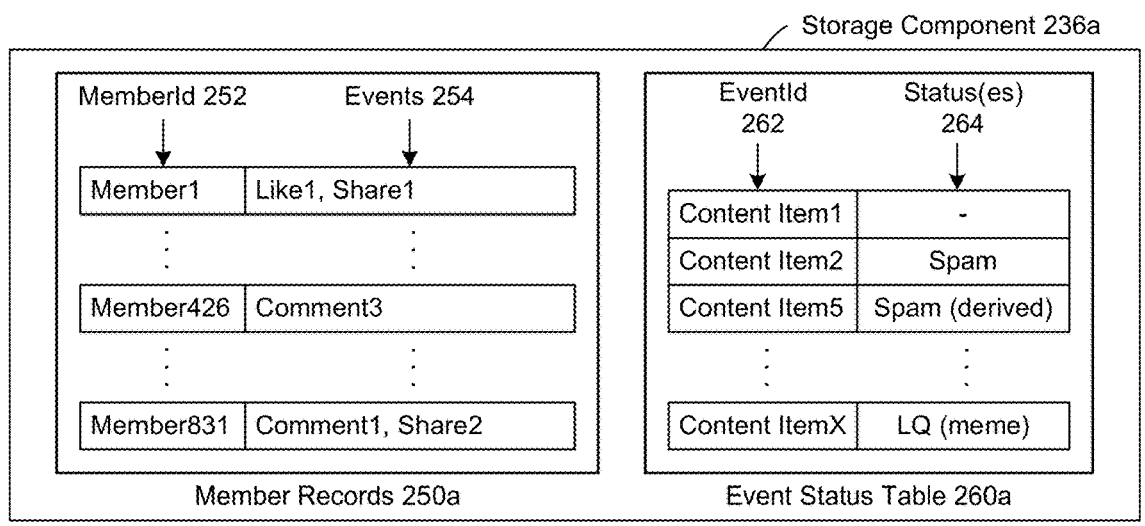
FIG. 2B depicts illustrative structures for separately storing events and event status, including the events of FIG. 2A, in accordance with some embodiments.
Figure 2B:
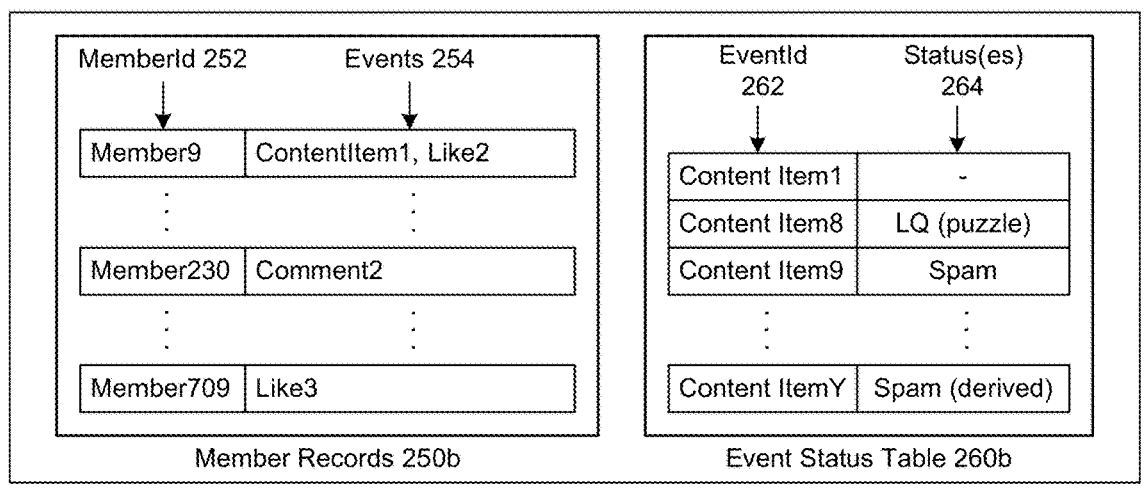

FIG. 2B depicts illustrative structures for separately storing events and event statuses, including the events of FIG. 2A, in accordance with some embodiments.

FIG. 2B reflects storage of the related events of relationship graph 200 of FIG. 2A across two retention (or storage) nodes. A first node includes storage component 236a, while a second node includes storage component 236b. As shown, each storage component includes member records 250 (i.e., member records 250a, 250b) and event status table 260 (i.e., event status tables 260a, 260b).

Each member record 250 includes identifier 252 of a corresponding member, and a list or other collection of events 254 associated with that member, if any, and may include other information not shown in FIG. 2B. In particular, a given event 254 may include any or all of the data or metadata mentioned herein, such as an identifier of a root event and/or some other event(s) (e.g., ancestor event(s), descendant event(s)), the event's current status, etc.

Each event in an event status table 260 includes an identifier 262 of the corresponding event and a list or other collection of statuses (or features) 264 assigned to, imputed to, inherited by, and/or otherwise associated with the event, if any, and may include other information not shown in FIG. 2B. For example, in some embodiments (but not all), an entry in an event status table 260 may identify one or more ancestor and/or descendant events, if any, such as an ancestor event from which one or more statuses were inherited or imputed.

The separate storage of events (in member records 250) and event statuses (in table 260) allows the scope of data operations on retention/storage nodes to be limited to what is necessary for a particular purpose, thereby avoiding unnecessary data retrieval, processing, and/or storage. For example, when a new event is stored, it is written to the associated member's record with the pertinent data/metadata and, if the new event's root and the status of that root are already stored in event status table 260, the event status table need not be modified, unless the table is configured to identify ancestors and/or descendants of its events, in which case one or more other entries in the table may be updated. The statuses of the new event's root and/or other ancestors may be read from event status table 260, so as to impute those statuses to the new event, as appropriate.

Conversely, when a new status is assigned to a given event that is one of multiple related events, instead of every node having to take action, in some embodiments just the statuses of that event and any descendant events that should inherit the status are updated (in event status table 260) on pertinent nodes (e.g., just the nodes that store the event and/or a descendant event).

The status of a root event (and possibly ancestor events, if any) may be examined every time a related event is considered for reporting or serving (e.g., for display within a customized user feed). If the root event (or an ancestor event) has a status that should be imputed to the related event and the status is such that the event should not be served (e.g., spam), the event will be dropped from consideration. Illustratively, its status as stored within its member record may be updated at that time.

Figure 3:
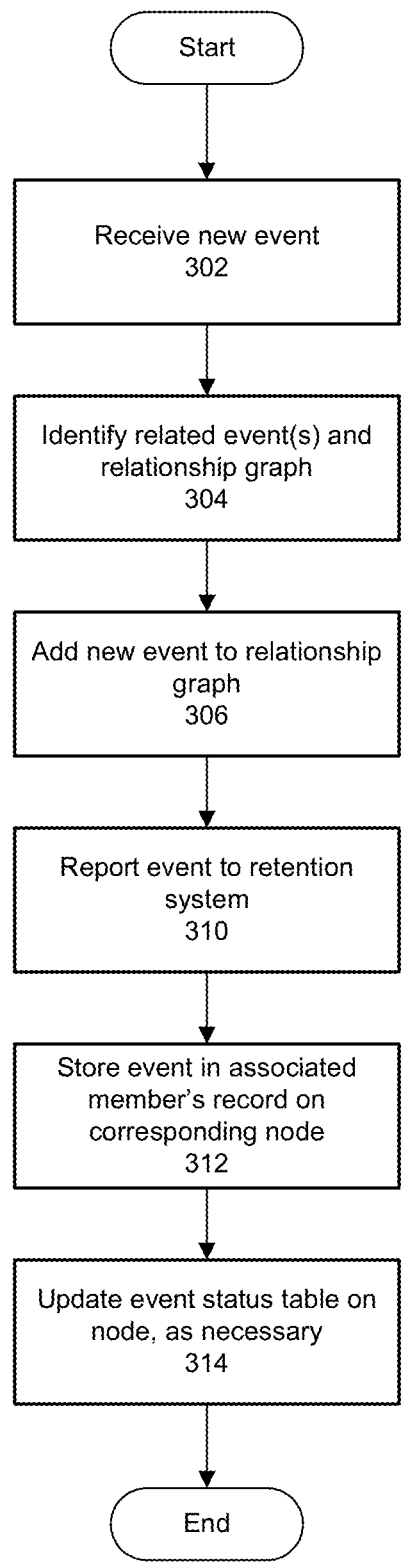
FIG. 3 is a flow chart illustrating a method of ingesting a new event that is related to one or more previous events, in accordance with some embodiments.

FIG. 3 is a flow chart illustrating a method of ingesting a new event that is related to one or more previous events, according to some embodiments. In one or more of these embodiments, one or more of the steps may be omitted, repeated, and/or performed in a different order. Accordingly, the specific arrangement of operations or steps shown in FIG. 3 should not be construed as limiting the scope of the embodiments.

In operation 302 a new event is received at a relationship system (or apparatus, mechanism, module, or other entity) of a professional or social network. In some implementations, some or all actions initiated by members of the network (e.g., actions of particular types) are reported to or captured by the relationship system. Along with the event the relationship system may receive identifiers of the member and the content item or previous event that the new event concerns (e.g., the item or event on which the member initiated a like, comment, share, or other action)—which may be termed the parent (or an ancestor) of the new event, an identifier of a relationship graph that comprises the parent item or event, an identifier of the root event, a timestamp, and/or other information.

In operation 304, the relationship system identifies the parent of the new event (e.g., if this information was not received with the new event), as well as the relationship graph that includes the parent. The relationship graph may include any number of nodes, each one representing a content item or action.

In operation 306, the new event is added as a child node of the parent item or event. In some implementations, in addition to maintaining relationship graphs of related events (e.g., in memory), some events may be stored (e.g., in secondary storage) by the relationship system for fault tolerance and/or other reasons. Illustratively, each event may be stored as a separate record, each set of related events corresponding to one relationship graph may be stored in a separate table or other structure, or the events may be stored in some other manner. Each event may be stored with any or all of the associated information identified herein (e.g., member identifier, an identifier of its root event, an identifier of its parent or some other ancestor event, status(es)).

In operation 310, the event is reported or forwarded to a retention system (or apparatus, mechanism, module, or other entity) of the network, to be stored in connection with the associated member. The event may be accompanied by related information, such as identifiers of one or more related events (e.g., root event, parent event), statuses of the one or more related events (if known), etc.

In operation 312, a retention node corresponding to the member (e.g., in an environment in which member records of events are sharded by member identifier) stores the new event as part of its member record for the member associated with the event, after creating the member record if necessary. The event information that is stored may include the event's identifier, the event's type (e.g., like, comment, share), a timestamp of the event, its status (e.g., an initial status may be null if no other status has yet been assigned), identifiers of one or more ancestor events (e.g., parent event, root event), etc.

In some embodiments, statuses of one or more ancestors of the new event (e.g., parent, root) may be imputed to the new event and may be stored with the new event. These statuses may be provided by or obtained from the relationship system, the current retention node (on which the new event is being stored), another retention node (e.g., where the parent event is stored), or some other entity.

In operation 314, the same retention node updates its event status table to include the root event of the new event and the root event's status (if that root event is not already in the table), or may update the root event's status if the root event is already in the table but now has a new/different status. In some implementations, the new event's parent event and/or other ancestor event(s) may also (or instead) be stored in the retention node's event status table.

Figure 4:
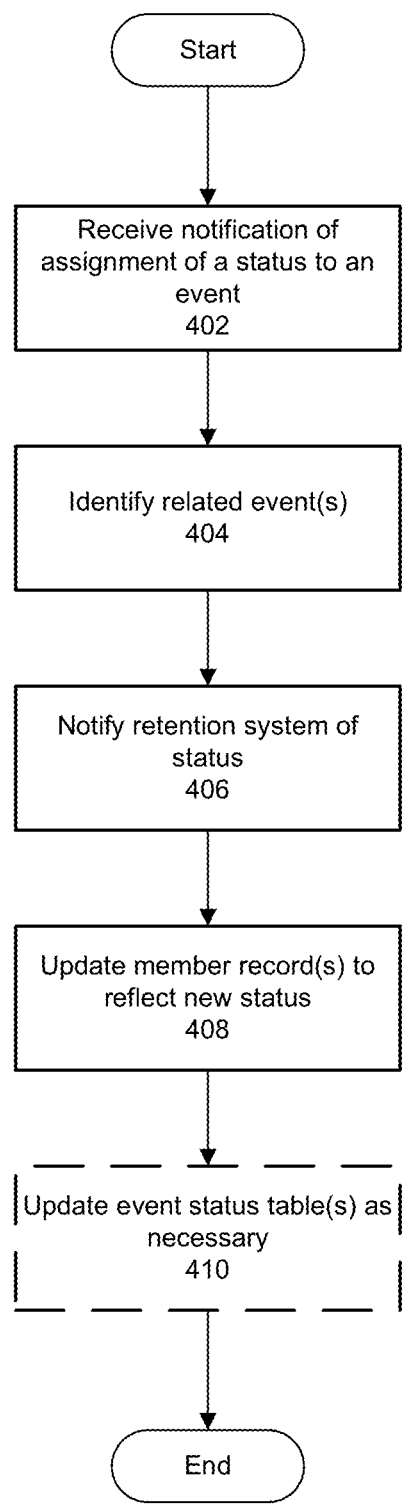
FIG. 4 is a flow chart illustrating a method of recording and propagating an event status, in accordance with some embodiments.

FIG. 4 is a flow chart illustrating a method of recording and propagating an event status, according to some embodiments. In one or more of these embodiments, one or more of the steps may be omitted, repeated, and/or performed in a different order. Accordingly, the specific arrangement of operations or steps shown in FIG. 4 should not be construed as limiting the scope of the embodiments.

In operation 402, the assignment (or a notification of the assignment) of a new or additional status to a target event is received at the relationship system. This information may include an identifier of the event, the status (or statuses) to be assigned to the event, a timestamp, a reason for assigning the status, an indication as to who or what assigned the status, etc.

Illustratively, the status may be assigned by a system operator, a component of the professional or social network (e.g., a component that automatically identifies certain statuses among events), may be assigned after some number of members report or opine that the target event has the indicated status, or may originate in some other manner. In some implementations, the new status of the target event may or may not be stored at the relationship system. For example, the current status of no events or of only selected events of each relationship graph may be stored at the relationship system (e.g., root events).

In operation 404, using the relationship graph that comprises the target event, and/or other information (e.g., event records stored by the relationship system), one or more related events may be identified, such as the root event and/or the parent of the target event (if the target event is not the root event of its relationship graph), children of the target event (if any), grandchildren, and so on.

In operation 406, the retention system is informed of the new status of the target event, and also receives the necessary accompanying information (e.g., identifiers of the target event and the associated member, the new status, identifiers of some or all related events, identifiers of members associated with the related events). Specifically, the relationship system may identify to the retention system those related events to which some or all of the new status should be imputed, if any, and/or the retention system may itself determine which (if any) related events the new status should affect.

For example, a new status assigned to the target event may be imputed to some or all events that descend from the target event, and only the retention nodes corresponding to members associated with those descendant events (and the target event itself) may receive notification of the new status. These nodes may be directly notified by the relationship system, or a router, controller or other component of the retention system may be informed (e.g., by the relationship system) of the associated members, and that component may notify the corresponding nodes.

In operation 408, one or more retention nodes (e.g., the node corresponding to the member associated with the target event, nodes corresponding to members associated with one or more related events) update their member records accordingly. Thus, the member record for the member associated with the target event is updated to reflect the target event's new status, and statuses of one or more related (e.g., descendant) events may be updated on the same node and/or different nodes.

In optional operation 410, event status tables at one or more nodes of the retention system are updated with a new event status. In particular, if the new status is being assigned to one or more events that did not already have that status, the event status tables that retain those events' statuses may be updated.

When events are needed for reporting or for inclusion in a content feed customized for a specific user, if the feed seeks events associated with one or more particular members (e.g., associates of the user), the events' statuses can be examined to determine whether the event should or should not be served. Some or all events marked as spam, for example, may not be served at all, to any user.

In some embodiments, events having a certain status may be allowed limited distribution, as opposed to no distribution (e.g., events marked as spam or derived spam) or open distribution (e.g., events having no or null statuses). In particular, in these embodiments a given event (or content item) may be limited to "network-only distribution," meaning that it can be served or displayed to members that have relationships with the member associated with the given event (i.e., members within that member's network of associates/friends/relations), but no other members.

For example, if an event created or initiated by a certain member (e.g., to post or share a content item), or corresponding content, is marked as "low-quality," and perhaps of a given nature (e.g., meme, photo, puzzle), it may only be servable to members of the certain member's network. Moreover, any events (e.g., likes, shares) based on or descending from the low-quality event may also only be servable to members of the certain member's network. Therefore, if a first member "likes" the low-quality event or content, that like event will only be viewable by members of the first member's network who are also members of the certain member's network.

In some embodiments, low-quality content items and events may be labeled or categorized for the purpose of determining how they will be treated—with full distribution permitted, no distribution permitted, network-only distribution, or some other scheme. Illustrative labels or categories for low-quality content in some implementations may include "adult," "meme," "offensive," "personal," "puzzle," and "shocking." Some or all of these may be further sub-labeled or subcategorized. For example, the adult category may include subcategories for "bikini/lingerie," "medical," "nude," "irrelevant," and/or others. The meme category may include subcategories for "quote with author," "irrelevant," and/or others. The personal category may have subcategories for "plea," "photo," "political belief," "religious belief," "self-promotion," and/or others. The shocking category may have subcategories for "global event" and "personal," and so on.

Subsequently, an event or content item assigned or imputed a category/subcategory such as adult/irrelevant, offensive, shocking/personal, and/or others, may be prevented from being served or displayed to anyone. An event or content item assigned or imputed a category/subcategory such as adult/medical, personal/photo, personal/self-promotion, and or others, may be limited to network-only distribution.

Figure 5:
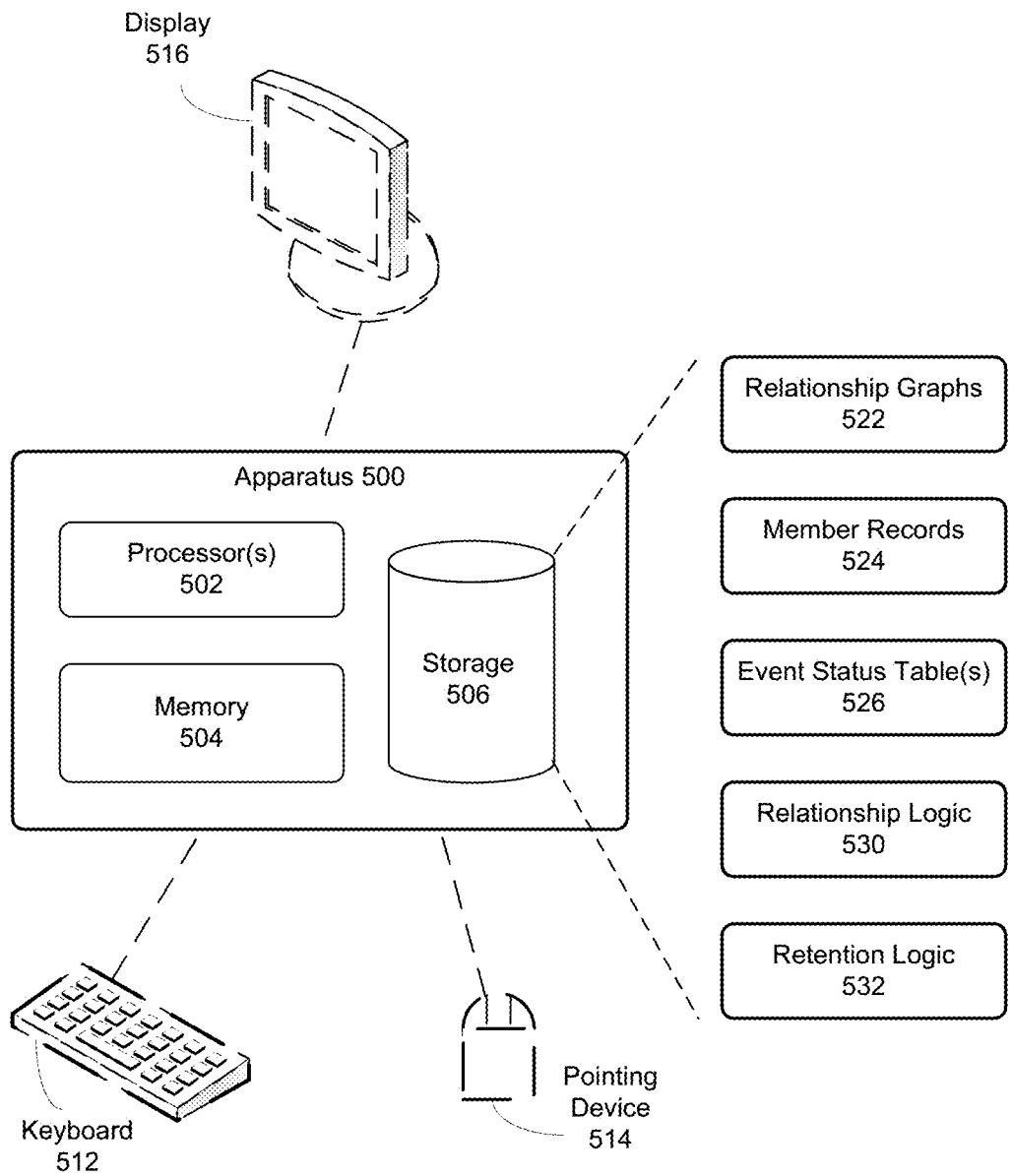
FIG. 5 depicts an apparatus for facilitating the propagation of a status among related events, in accordance with some embodiments.

FIG. 5 depicts an apparatus for facilitating the propagation of a status among related events, according to some embodiments. The apparatus is operated as part of a professional network or other network hosting an online community of users.

Apparatus 500 of FIG. 5 includes processor(s) 502, memory 504, and storage 506, which may comprise any number of solid-state, magnetic, optical, and/or other types of storage components or devices. Storage 506 may be local to or remote from the apparatus. Apparatus 500 can be coupled (permanently or temporarily) to keyboard 512, pointing device 514, and display 516.

In some embodiments, an apparatus may perform only some of the functions described here, and may cooperate with one or more other apparatuses performing other functions. In particular, one or more apparatuses may be configured and operated as relationship system 110 of FIG. 1, while other apparatuses are configured and operate as retention system 130.

Storage 506 is (or includes) one or more data repositories that store relationship graphs 522 (i.e., graphs of related events), member records 524, and event status tables 526. Each relationship graph 522 includes multiple nodes corresponding to inter-related events and/or content items. Member records 524 include records for each member that has conducted one or more events in the network, wherein each record identifies those events (e.g., and their statuses) associated with the corresponding user. Each event status table 526 comprises one or more events (e.g., root events for some or all relationship graphs 522, ancestor events of events in member records 524) and their statuses.

Storage 506 also stores logic and/or logic modules that may be loaded into memory 504 for execution by processor(s) 502, including relationship logic 530 and retention logic 532. In other embodiments, these logic modules may be aggregated or divided to combine or separate functionality as desired or as appropriate.

Relationship logic 530 comprises processor-executable instructions for creating and maintaining relationship graphs 522, identifying events related to a given event (e.g., a new event, an event assigned a new status), and/or taking other action. For example, when a given event is assigned a new status, the relationship logic may be responsible for determine which related events (if any) should inherit or adopt the same status.

Retention logic 532 comprises processor-executable instructions for maintaining member records 524 and event status table(s) 526. The two sets of data may be stored separately in order to limit the input/output that is necessary to ingest a new event, update statuses of one or more events, propagate an event status to one or more related events, etc.

Retention logic 532 may also be configured to determine which events (if any) are suitable for inclusion in a user feed or other collection of events to be served or displayed. To do so, the retention logic may identify candidate events (e.g., events associated with members having relationships with the target member to receive the collection of events), if the candidate events were not already identified, and filter out those that cannot be delivered to the target member. An event may be filtered out if, for example, it is marked for no distribution (e.g., it has a spam status) or for network-only distribution and the target member is not in the associated member's network.

An environment in which one or more embodiments described above are executed may incorporate a data center, a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:
1. A method, comprising:
receiving a first event associated with a first user of an online service;

storing the first event in a first user record corresponding to the first user, wherein:
- user records corresponding to multiple users of the online service, including the first user record corresponding to the first user, are sharded across multiple storage nodes; and
- each node comprises at least one processing component and at least one storage component;

updating a hierarchical graph comprising a set of related events having a root event, to include the first event; and upon receipt of a new status for a second event among the related events, wherein the second event is associated with a second user:
- imputing the new status to a subset of the related events by updating, on each of one or more of the multiple storage nodes, an event status table stored on the node to associate the new status with at least one of the related events.

2. The method of claim 1, wherein said storing the first event comprises, at a first node:
updating the first user record to include the first event; and
updating an event status table separate from the user record to record a status of the root event of the first event, wherein the root event is the earliest event to occur among the related events.

3. The method of claim 1, further comprising, upon receipt of the new status for the second event:
recording the new status of the second event in a second user record corresponding to the second user; and
for each event in the subset of related events, updating a user record corresponding to the user associated with the event to record the imputed status.

4. The method of claim 1, wherein imputing the new status to the subset of related events comprises:
using the graph to identify the subset of related events.

5. The method of claim 4, wherein imputing the new status to a given related event comprises assigning an imputed form of the new status to the given related event.

6. The method of claim 4, wherein:
the graph is updated and maintained by a relationship component of the online service;
the multiple nodes comprise a retention component of the online service; and
the subset of related events is identified without searching the multiple nodes.

7. The method of claim 1, wherein the new status is 'low-quality' and includes at least one of the following categories:
adult;
meme;
offensive;
personal;
puzzle; and
shocking.

8. The method of claim 1, wherein, based on the new status, the new event is visible only to users of the online service that have relationships with the second user.

9. An apparatus, comprising:
one or more processors; and
memory storing instructions that, when executed by the one or more processors, cause the apparatus to:
receive a first event associated with a first user of an online service;
store the first event in a first user record corresponding to the first user, wherein:
- user records corresponding to multiple users of the online service, including the first user record corresponding to the first user, are sharded across multiple storage nodes; and
- each node comprises at least one processing component and at least one storage component;

update a hierarchical graph comprising a set of related events having a root event, to include the first event; and upon receipt of a new status for a second event among the related events, wherein the second event is associated with a second user:
- impute the new status to a subset of the related events by updating, on each of one or more of the multiple storage nodes, an event status table stored on the node to associate the new status with at least one of the related events.

10. The apparatus of claim 9, wherein said storing the first event comprises, at a first node:
updating the first user record to include the first event; and
updating an event status table separate from the user record to record a status of the root event of the first event, wherein the root event is the earliest event to occur among the related events.

11. The apparatus of claim 9, wherein the memory further stores instructions that, when executed by the one or more processors, cause the apparatus to, upon receipt of the new status for the second event:
record the new status of the second event in a second user record corresponding to the second user; and
for each event in the subset of related events, update a user record corresponding to the user associated with the event to record the imputed status.

12. The apparatus of claim 9, wherein imputing the new status to the subset of related events comprises:
using the graph to identify the subset of related events.

13. The apparatus of claim 12, wherein imputing the new status to a given related event comprises assigning an imputed form of the new status to the given related event.

14. The apparatus of claim 12, wherein:
the graph is updated and maintained by a relationship component of the online service;
the multiple nodes comprise a retention component of the online service; and
the subset of related events is identified without searching the multiple nodes.

15. The apparatus of claim 9, wherein the new status is 'low-quality' and includes at least one of the following categories:
adult;
meme;
offensive;
personal;
puzzle; and
shocking.

16. The apparatus of claim 9, wherein based on the new status, the new event is visible only to users of the online service that have relationships with the second user.

17. A method, comprising:
identifying a set of related events within an online service, including a root event that precedes in time all other events in the set;
generating a hierarchical acyclic graph of the set of related events, wherein the root event is represented by a root node and every other related event is represented by a separate node;

storing, on each of multiple storage nodes of the online service, each storage node comprising a processor component and a storage component:

user records corresponding to multiple users of the online service, wherein each user record identifies:

events associated with the corresponding user; and for each event associated with the corresponding user that is a member of the set of related events, one or more additional events that are also members of the set of related events, including the root event; and an event status table that stores statuses of the one or more additional events;

identifying a new status assigned to a first event in the set of related events, wherein the first event is associated with a first user; and imputing the new status to at least one other event in the set of related events by:

identifying, from the graph, at least one event in the set of related events that descend from the first event; and propagating the new status of the first event only to nodes of the online service that store user records that include the descendant events, and not to all nodes of the online service.

18. The method of claim 17, wherein said imputing the new status to at least one other event further comprises:

reading, from a first user record associated with the first user, identities of the one or more additional events, wherein each of the one or more additional events is associated with a different user; and further propagating the new status of the first event to nodes of the online service that store user records corresponding to the different users.

19. The method of claim 18, wherein based on the new status, the first event is visible only to users of the online service that have relationships with the first user.

\* \* \* \* \*